G. F. HALL.
PACKAGING MACHINE.
APPLICATION FILED OCT. 22, 1908.
999,555.
Patented Aug. 1, 1911.
5 SHEETS—SHEET 1.
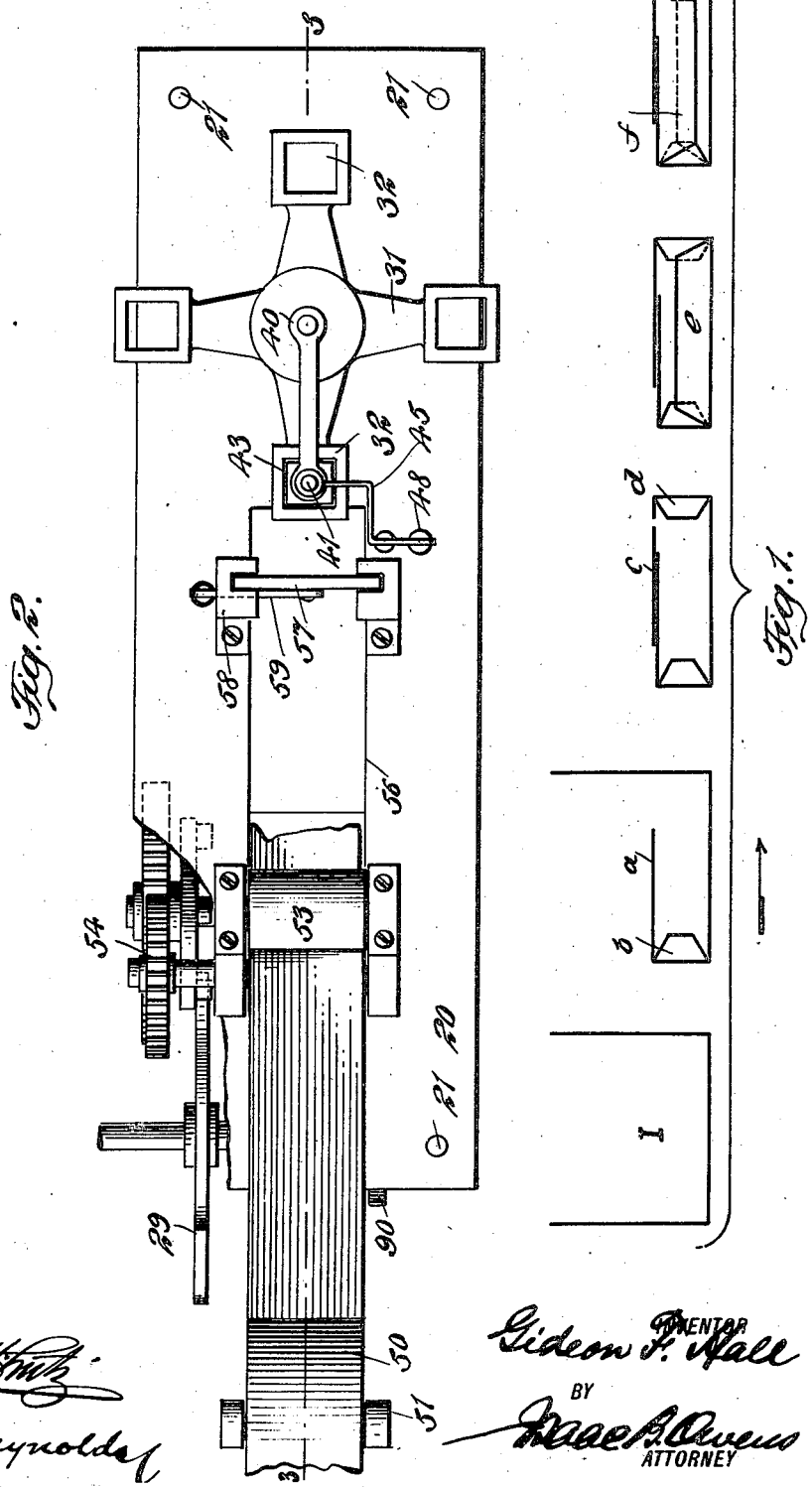

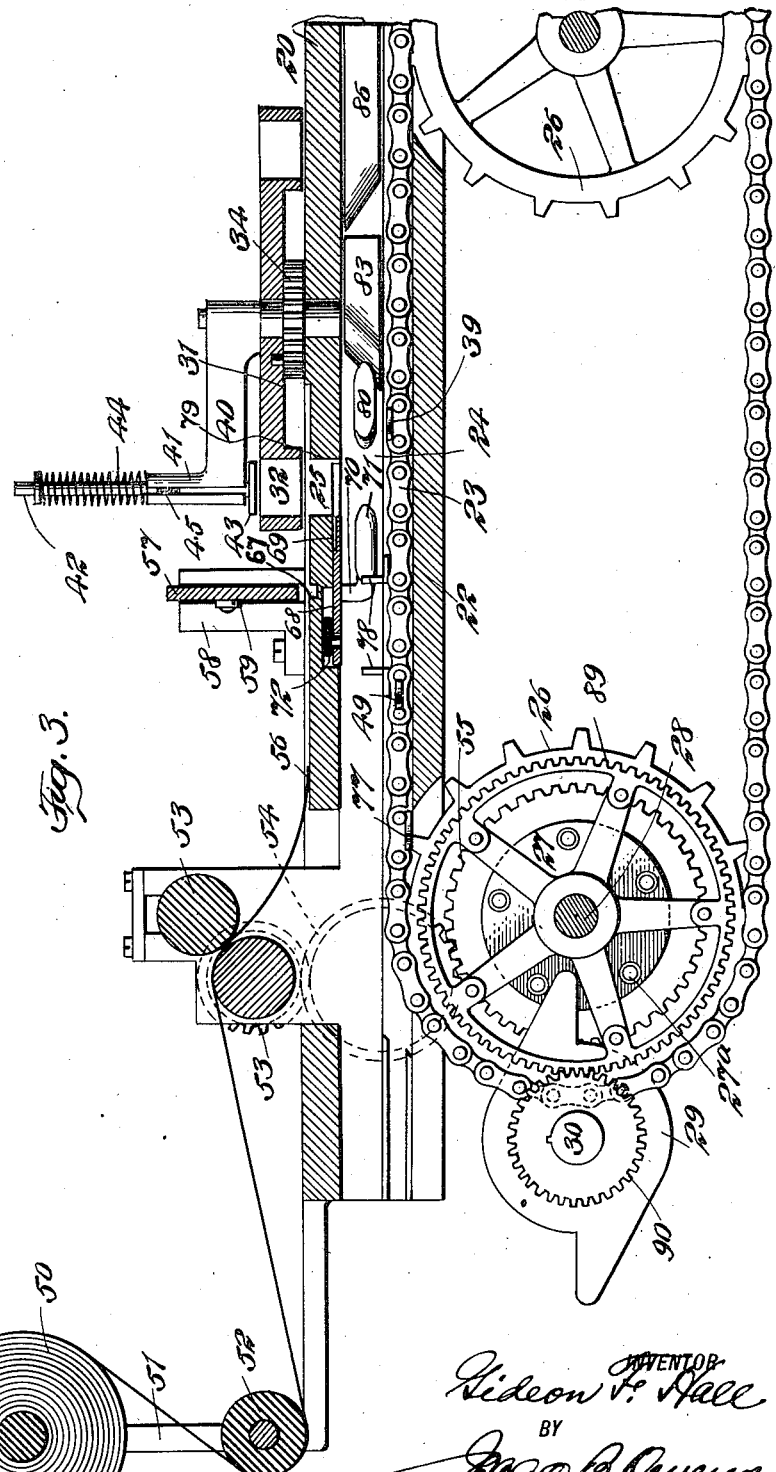

G. F. HALL.
PACKAGING MACHINE.
APPLICATION FILED OCT. 22, 1908.
999,555.
Patented Aug. 1, 1911.
5 SHEETS—SHEET 3.
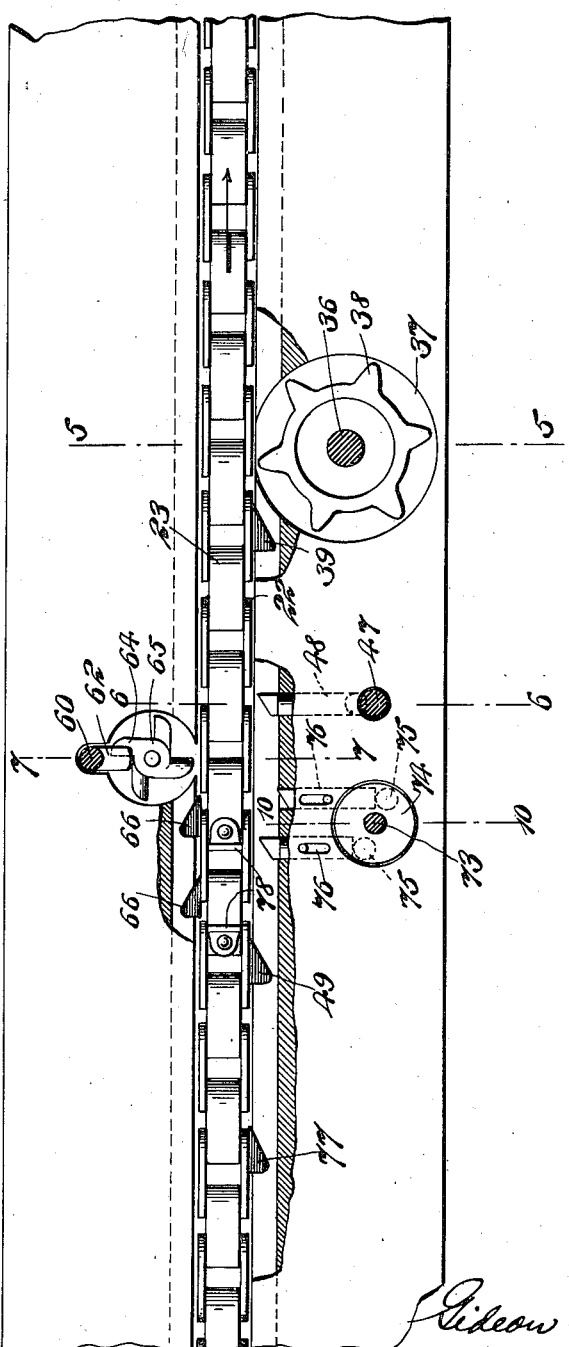
WITNESSES
INVENTOR
Gideon F. Hall
BY
ATTORNEY

G. F. HALL.
PACKAGING MACHINE.
APPLICATION FILED OCT. 22, 1908.

999,555.

Patented Aug. 1, 1911.
5 SHEETS—SHEET 4.

WITNESSES
Julius H. Fritz
Louis H. Reynolds

INVENTOR
Gideon F. Hall
BY
Isaac B. Owens
ATTORNEY

G. F. HALL.
PACKAGING MACHINE.
APPLICATION FILED OCT. 22, 1908.
999,555.
Patented Aug. 1, 1911.
5 SHEETS—SHEET 5.
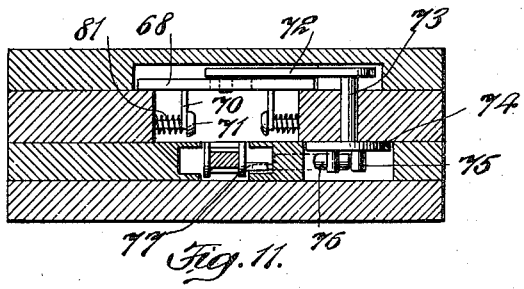
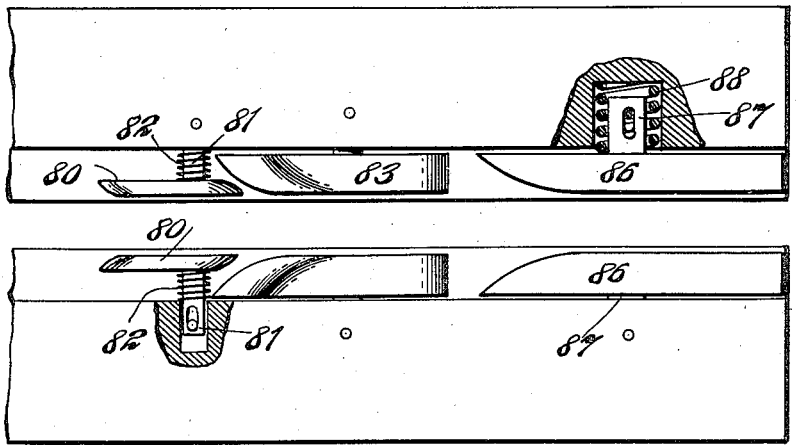
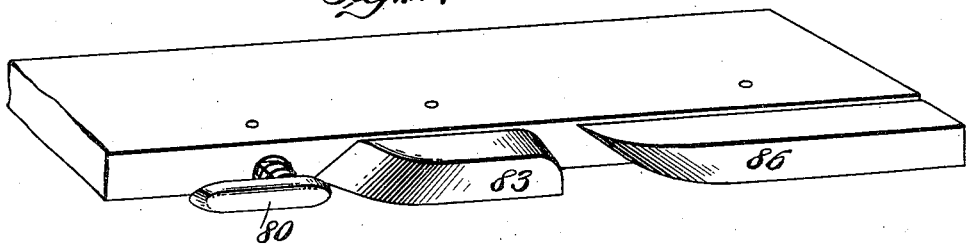
WITNESSES
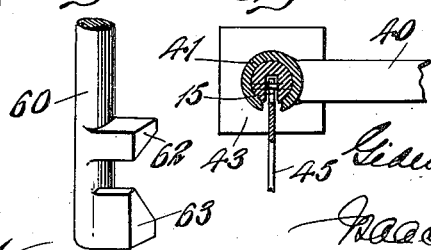
INVENTOR
Gideon F. Hall
BY
Isaac B. Owens
ATTORNEY

UNITED STATES PATENT OFFICE.

GIDEON F. HALL, OF BROOKLYN, NEW YORK, ASSIGNOR OF TWO-THIRDS TO JOSEPH F. GARCIA, OF BROOKLYN, NEW YORK.

PACKAGING-MACHINE.

999,555.        Specification of Letters Patent.        Patented Aug. 1, 1911.

Application filed October 22, 1908. Serial No. 458,982.

*To all whom it may concern:*

Be it known that I, GIDEON F. HALL, of the borough of Brooklyn, county of Kings, State of New York, have invented certain new and useful Improvements in Packaging-Machines, of which the following is a full, clear, and exact specification, such as will enable others skilled in the art to which it appertains to make and use the same.

My invention relates to a machine for automatically wrapping rectangular packages such as caramels, although it may be adapted without material change to operations on numerous other articles.

The central idea of the invention involves the automatic movement of the wrapping and the goods over a fixed path in the machine by which movement the wrapping is engaged by cam surfaces and other peculiar devices and the necessary folds thereby successively effected.

A further feature of the invention resides in the use of the chain or other means for propelling the goods, as the means for imparting, in proper time, the necessary operative motions to the moving parts of the machine, thus making one part serve a double function and to that extent simplifying the mechanism.

Various other features of importance are involved and all will be fully set forth hereinafter and particularly pointed out in the claims.

Reference is had to the accompanying drawings which represent as an example, one manner in which the principles of my invention may be practically embodied and in which—

Figure 5:
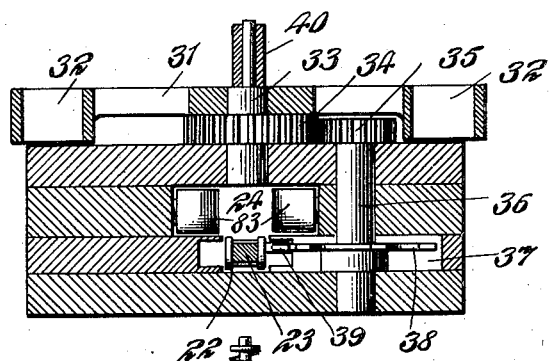
Figure 6:
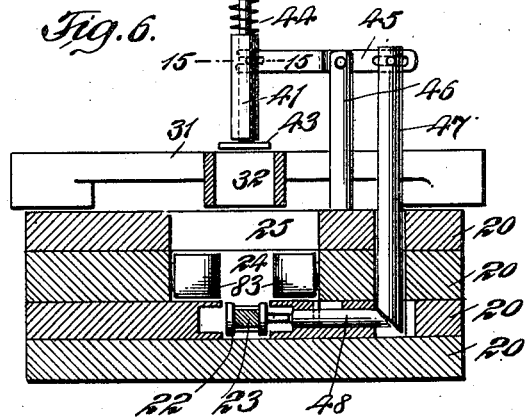
Figure 8:
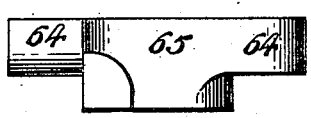
Figure 7:
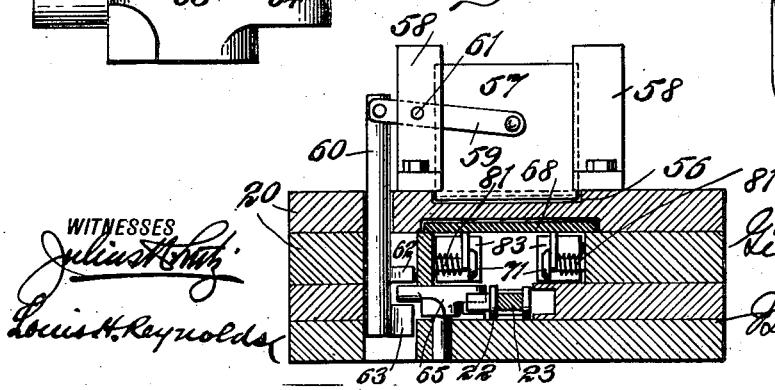
Figure 9:
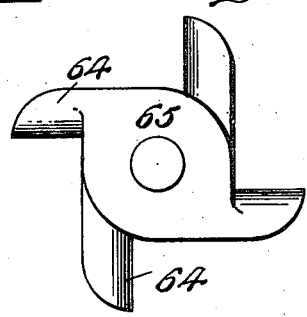

Figure 1 is a series of five diagrams illustrating the manner of making the various folds of the wrapping; Fig. 2 is a plan view of the machine; Fig. 3 is a central longitudinal section on the line 3—3 of Fig. 2; Fig. 4 is a plan view with parts in section illustrating the chain and the means for driving the operative parts; Fig. 5 is a section on the line 5—5 of Fig. 4 showing the hopper and its driving devices; Fig. 6 is an irregular section approximately on the line 6—6 of Fig. 4 showing the devices for pressing the goods from the hopper to the chain; Fig. 7 is a section on the line 7—7 of Fig. 4 showing the paper knife and its operating devices; Figs. 8 and 9 are detail views of the cam wheel forming part of the knife operating devices; Fig. 10 is a section on the line 10—10 of Fig. 4 showing the folder blade and its operating devices; Fig. 11 is an enlarged plan view showing the cams for making certain of the folds in the wrapper as will hereinafter fully appear; Fig. 12 is a perspective view of one set of said cams; Fig. 13 is an edge view of the folder blade showing the cam fingers thereon; Fig. 14 is a detail perspective of the cam driven bar forming part of the paper knife operating device illustrated in Fig. 7; and Fig. 15 is a detail section on the line 15—15 of Fig. 6 showing the manner of mounting the hopper plunger.

The form and construction of the framing of the machine is unimportant and for the sake of brevity has not been fully illustrated. The table or top portion of the framing alone is here shown and this is preferably composed of laminations 20 secured by dowels or the like as illustrated at 21 in Fig. 2, which furnishes a convenient manner of constructing the machine and of assembling its parts. In the table is formed, longitudinally thereof, a pathway 22 for the chain 23 and above this a pathway 24 for the goods. In the top lamination 20 an opening 25 is formed through which the goods are introduced into the pathway 24. The chain 23 is preferably a sprocket of the usual type and runs over wheels 26 to one of which continuous driving motion is imparted by gears 89 and 90 fastened respectively to the sprocket and to the rotating prime mover 30, this sprocket 26 and the gear 89 being loosely mounted on the shaft 28 of said sprocket.

The hopper is in the form of a spider 31 having pockets 32 conforming to the shape of the goods and into which the goods are placed manually by an attendant. This spider 31 is mounted to turn on a stud shaft 33 rising from the table and the hopper is so positioned that its pockets pass over and in line with the opening 25. The hopper is given a step by step motion so that its pockets will successively rest over the opening 25 and allow the goods to fall or be pushed from the pockets into and through such opening. For so operating the hopper a gear 34 is pinned to the hopper on the center of the stud 33 and is meshed with a gear 35 on a rotating shaft 36 (see Fig. 5). This shaft stands vertically in the table and carries in a recess 37 on the level of the pathway 22 a star wheel 38 (see Fig. 4) which is intended to be engaged by a cam stud 39 on the chain 23. In this manner the shaft 36 is intermittently rotated and from it the hopper is driven as described.

On the stationary stud 33 is fastened an arm 40 which overhangs the opening 25 and has a slotted vertically disposed bearing 41 carrying the pin 42 of the hopper plunger 43. 44 indicates a spring coiled around this pin and serving to keep the plunger normally raised clear of the pockets of the hopper. When a pocket of the hopper comes to rest over the opening 25 the plunger 43 makes a descent through the pocket and presses the goods from the pocket through the opening and into the pathway 24. For so moving the plunger a lever 45 is extended through the slot in the bearing 41 and pivoted to the pin 42. Said lever is fulcrumed on a stud 46 carried by the table and its second arm is articulated to a pin 47 sliding vertically in a cavity in the table. At its lower end the pin 47 is beveled (see Fig. 6) and engaged by the corresponding beveled end of a horizontally sliding pin 48 carried in one of the laminations 20 of the tables. The inner end of the pin 48 is also beveled (see Fig. 4) and it is adapted to be engaged by a cam 49 also on the chain 23 but at an elevation different from that of the cam 39 so that these cams will strike and actuate only the devices related to them. As the cam 49 pushes in the pin 48 the pin 47 is raised thus throwing down the inner end of the lever 45 and actuating the plunger 43. When the cam 49 leaves the pin 48 the spring 44 returns the parts to normal or inactive position.

The goods by my invention are wrapped in paper or equivalent material and according to the machine here illustrated this paper is supplied from a roll 50 sustained by a bracket 51. From the roll 50 the paper passes under an idler 52 and thence between feed rolls 53. These feed rolls are driven by an intermediate gear 54 in turn driven from a spur 55 loose on the shaft 28. The gear 55 has fastened thereto a disk 27 carrying pins 27ª adapted to be engaged by a two fingered wiper 29 fastened on the shaft 30. In this manner the paper is fed intermittently in time with the other operations of the machine as will fully appear hereinafter. The top of the table is formed with a way 56 (see Fig. 2) along which the paper is designed to travel, said way extending over the opening 25 and beyond to a point near the stud shaft 33.

57 indicates the knife which serves to cut the paper into lengths suitable for wrapping the goods. This knife is guided vertically in boxes 58 and is actuated by a lever 59 one arm of which is pivoted to the knife 57 and the other arm is pivoted to the bar 60 guided vertically in the table. The lever 59 is fulcrumed on one of the boxes 58 as indicated at 61. Said bar 60 is formed (see Figs. 7 and 14) with lugs 62 and 63 having inclined surfaces which are adapted to be engaged by the cam fingers 64 of a wheel 65. This wheel is suitably arranged in a cavity in the table and is designed to be actuated intermittently by two cams 66 on the chain 23. The cam surfaces on the parts 62, 63 and 64 are so disposed that rotation of the wheel 64 will result in a back and forth motion of the bar 60 and in this manner the lever 59 is operated to raise and lower the knife 57, which knife, stroking against the ledge blade 67, serves to cut the paper into lengths suitable for wrapping the goods. It will, therefore, appear that the goods are pushed through the opening 25 by the plunger 43 the section of paper severed by the knife 57 lying under the goods and passing down with the same through the opening 25 into the pathway 24. At this period the paper assumes the position shown at I in Fig. 1, its ends lying vertically in the opening 25. The second operation consists in folding over one of the edges of the paper as indicated at $a$ in Fig. 1 and in tucking in one side of the same as indicated at $b$ in Fig. 1. This is effected by the folder blade 68 (see Figs. 3 and 10). Said blade is horizontally reciprocated in a cavity 69 in the table just over the pathway 24 and is designed to stroke partially over the opening 25, moving faster than the chain 23 as will hereinafter appear, and folding down the flap or edge as seen at $a$ in Fig. 1. The blade 68 carries on its under side fingers 70 which extend downward and thence horizontally into the pathway 24 and have the cams 71 attached as shown. These cams, moving with the blade, serve to stroke past the ends of the goods and to fold in the side edges of the paper or wrapping as indicated at $b$ in Fig. 1. The blade 68 is actuated by an arm 72 fastened on a rock shaft 73 arranged vertically in the table. At its lower end the shaft 73 carries a disk 74 to which two pins 75 are fastened and these pins are engaged by push pins 76 sliding horizontally in the table and actuated by a cam 77 on the chain 23. As the chain advances the shaft 73 is given a rapid rocking motion and this is transmitted to the arm 72 which gives the blade 68 a rapid forward and back motion, the forward motion being sufficient to overtake the goods, moving with the chain as will hereinafter appear, and turn down the fold as shown at $a$ Fig. 1. At the same time the cams 71 move past the ends of the goods and tuck in the ends of the wrapping as shown at $b$ Fig. 1.

The first periods in the operation of the machine are the action of the rolls 53 to feed the paper, the knife 57 to sever the same and the rotation of the hopper to position one of the pockets 32 over the opening 25. These are brought about by the devices before described. At this time the chain 23 has advanced sufficiently to bring its two lugs 78 beneath the opening 25 so that the goods are received on the chain between the lugs. At this time the plunger 43 descends and moves the goods through the opening 25 and the continued motion of the chain causes the blade 68 and cams 71 to overtake the goods and fold the wrapper as previously described. The next operation is illustrated in Fig. 1, when the opposite edge is folded down as at c and the opposite end is tucked in as at d. This is brought about by the motion of the goods, with the chain under the wall 79 which folds down the flap c Fig. 1, and immediately thereafter the ends of the wrapper run against the cams 80 which tuck in such ends d. The arms 70 carrying the cams 71 are slightly yielding to compensate for variations in the size of the goods and for the same reason that the cams 80 are carried on studs 81 movable transversely in the table and pressed by springs 82. The wrapper having assumed at each end the form indicated at c and d in Fig. 1, the next operation thereon consists in folding upward the bottom part of the wrapper as indicated at e Fig. 1. This is effected by the advance of the goods with the chain 23 past the cams 83. Said cams are arranged in and at opposite sides of the pathway 24 and are so shaped that as the ends of the wrapper pass them the bottom parts of such wrapper are turned upwardly by the cams and the fold e is thereby effected. To allow for variations in the size of the goods the cams 83 are guided transversely by studs and springs the same as the cams 80. Finally the top parts of the ends of the wrapper are folded down as at f Fig. 1. This is effected by the cams 86 which are disposed oppositely to the cams 83. The cams 86, like the cams 80 and 83, are guided transversely by studs 87 and pressed inward by springs 88 (see Fig. 11), which allow the cams to give and take according to the varying sizes of the goods being wrapped. These operations take place as the goods advance with the chain 23 and after the goods pass the cams 86 they emerge from the machine with the wrapper folded at each end as described.

The operation of the organized machine may be traced as follows: At the beginning of the operation the parts 29, 27, 55 and 54 cause the rolls 53 to operate and a section of paper is fed under the knife 57 and hopper 31 and over the opening 25. The chain 23 moves continuously and simultaneously with the feeding of the paper. The cam 39 strikes the wheel 38 and the hopper is given a partial movement positioning one of the pockets 32 over the opening 25. Instantly thereafter the cams 66 actuate the cam wheels 65 and cause the knife 57 to sever the wrapping paper into the necessary length; and upon the completion of this descent of the knife, the cam 49 strikes the pin 48 and forces the plunger through the pocket 32 below it and into the opening 25 carrying down onto the chain 23 the caramel or other article to be wrapped. At this time the chain 23 has advanced sufficiently to bring the lugs 78 at opposite sides of the opening 25 and the article to be wrapped is seated on the chain between the lugs with the wrapper bent U-shaped under it in the form indicated at I Fig. 1. The lugs 78 bearing on opposite sides of the caramel or the like, hold the same true on the chain and prevent it from turning sidewise in the pathway 24. At the instant the article is thus seated on the chain, the cam 77 acts on the pins 76 and cause the folder blade 68 to move rapidly forward faster than the chain thereby overtaking the article and turning down and forward the first fold indicated at a Fig. 1. This movement of the folder 68 also advances the cams 71 past the ends of the article and folds the corners of the wrapper as at b Fig. 1. The blade 68 then returns and the continuing movement of the chain carries the article successively past the cams 80, 83 and 86 and the shoulder 79, making the folds c, d, e and f Fig. 1 as before explained. From the cam 86 the chain 23 carries the wrapped article out of the machine.

In the drawings, in the interest of simplicity, I have shown the chain 23 equipped with only one set of cams 39, 49, 66 and 77 and lugs 78. In practice, however, the chain may be equipped with any number of such sets, as convenience and expedience may dictate, the object being in practice to have the operations follow each other in rapid succession, thereby operating the machine to its full capacity. Further, the proportions and arrangement of the parts and the timing of the various operations are intended to be indicated only approximately in the drawings; various changes may be made in this respect without departing from the invention so long as the principles of operation set forth in the specification and claims are preserved.

Having thus described my invention, what I claim as new and desire to secure by Letters Patent of the United States is:

1. A packaging machine having parts forming a pathway for the article and its wrapper, means for introducing the article laterally into such pathway, a folder blade adapted to move over the article and fold down one side of the wrapper, fingers moving in unison with the folder blade to engage the ends of the wrapper and form tucks inward to the end of the article, means for advancing the article and wrapper in the pathway, whereby the top wall of the pathway folds down the second side of the wrapper, cams at opposite sides of the pathway to engage the ends of the wrapper opposite the said tucks and form other tucks in direction toward the first tucks, and two additional cams at each side of the pathway disposed oppositely to each other and adapted to engage the ends of the wrapper at points between the said tucks and fold such points inward toward each other over the tucks, the article and wrapper being moved continuously and the folder blade moving with the article but faster than the same to overtake it.

2. A packaging machine having parts forming a pathway for the article and its wrapper, means for introducing the article laterally into such pathway, a folder blade adapted to move over the article and fold down one side of the wrapper during the advancement of the article, fingers moving in unison with the folder blade to engage the ends of the wrapper and form tucks inward to the end of the article, a traveling chain for advancing the article and wrapper in the pathway, whereby the top wall of the pathway folds down the second side of the wrapper, cams at opposite sides of the pathway to engage the ends of the wrapper opposite the said tucks and form other tucks in direction toward the first tucks, and two additional cams at each side of the pathway disposed oppositely to each other and adapted to engage the ends of the wrapper at points between the said tucks and fold such points inward toward each other over the tucks.

3. A packaging machine having parts forming a pathway for the article and its wrapper, means for introducing the article laterally into such pathway, a folder blade adapted to move over the article and fold down one side of the wrapper, fingers moving in unison with the folder blade to engage the ends of the wrapper and form tucks inward to the end of the article, means for advancing the article and wrapper in the pathway, whereby the top wall of the pathway folds down the second side of the wrapper, cams at opposite sides of the pathway to engage the ends of the wrapper opposite the said tucks and form other tucks in direction toward the first tucks, and two additional cams at each side of the pathway disposed oppositely to each other and adapted to engage the ends of the wrapper at points between the said tucks and fold such points inward toward each other over the tucks, and devices set in action by said means for advancing the article and wrapper for operating the folder blade in proper time.

4. A packaging machine having parts forming a pathway for the article and its wrapper, means for introducing the article laterally into such pathway, a folder blade adapted to move over the article and fold down one side of the wrapper, fingers moving in unison with the folder blade to engage the ends of the wrapper and form tucks inward to the end of the article, a traveling chain for advancing the article and wrapper in the pathway, whereby the top wall of the pathway folds down the second side of the wrapper, cams at opposite sides of the pathway to engage the ends of the wrapper opposite the said tucks and form other tucks in direction toward the first tucks, two additional cams at each side of the pathway disposed oppositely to each other and adapted to engage the ends of the wrapper at points between the said tucks and fold such points inward toward each other over the tucks, and means for operating the folder blade in proper time including a part in a predetermined position on the chain.

5. A packaging machine having a carrier chain to advance the article and its wrapper, devices against which the wrapper is moved to fold the same, a hopper having a plurality of pockets to position the articles, a single plunger to move articles from the several pockets successively to the chain and devices controlled from the chain for operating the plunger.

6. A packaging machine having a carrier chain to advance the article and its wrapper, devices against which the wrapper is moved to fold the same, a member having a plurality of pockets to position successive articles, a single plunger to move the articles from the pockets to the chain, devices controlled from the chain for operating the plunger, such devices comprising a detent-cam on the chain and connections to the plunger arranged in the path of the detent cam.

7. A packaging machine having a hopper rotating with a step-by-step motion to position the article to be received by the carrier, gearing including a star wheel to operate the hopper, folding devices, a carrier for advancing the article and wrapper to such devices and a means on the carrier periodically to engage said star wheel for the purpose specified.

8. A packaging machine having folding means for the wrapper, a carrier to advance the article and wrapper to the folding means, a hopper having a plurality of chambers each receiving a single article, a member to move the articles from said chambers in succession to the carrier and devices for operating the second named means, such devices driven periodically from the carrier.

9. A packaging machine having folding means for the wrapper, a carrier to advance the article and wrapper to the folding means, a hopper, means to move the article from the hopper to the carrier, devices for operating the second named means, such devices driven periodically from the carrier, the hopper moving to position the article and devices for moving the hopper also driven periodically from the carrier.

10. A packaging machine having a movable hopper to position the article, means for moving said hopper, folding devices, a carrier chain for receiving the article from said hopper and serving to advance the article and its wrapper past the folding devices, and means on the carrier chain acting to periodically actuate said hopper moving means.

11. A packaging machine having parts forming a pathway along which the article and wrapper travel, folding devices with which the wrapper contacts to fold the same, a hopper, a plunger to move the article from the hopper to the pathway and an endless carrier chain movable along said pathway to advance the article and having a detent for operating the plunger.

12. A packaging machine having an endless carrier chain, a hopper rotating with a step by step motion to position the article to be received by said carrier chain, and gearing including a star wheel to operate the hopper, said chain having a detent for engaging with said star wheel to intermittently rotate the latter.

13. A packaging machine having an endless carrier chain, an intermittently moving hopper, and a plunger for moving articles from said hopper to said chain, said chain having means carried thereby for operating said hopper and said plunger.

14. A packaging machine having a hopper, a plunger for removing articles therefrom, a folding device, a wrapper cutting device and an endless carrier chain for receiving the article from the plunger and for operating said hopper, plunger, folder, and cutter intermittently and separately.

15. A packaging machine having parts forming a pathway, a flexible endless carrier movable along said pathway and adapted to support the article and wrapper, a spider mounted above said carrier and having a plurality of pockets, said spider being rotatable to move said pockets transversely of said carrier in succession, a plunger mounted above said spider and serving to remove the articles from said pockets successively, means for moving said carrier continuously and means on said carrier for moving said spider.

16. A packaging machine having parts forming a pathway, a flexible endless carrier movable along said pathway and adapted to support the article and wrapper, a spider mounted above said carrier and having a plurality of pockets, said spider being rotatable to move said pockets transversely of said carrier in succession, a plunger mounted above said spider and serving to remove the articles from said pockets successively, means for moving said carrier continuously, means on said carrier for moving said spider, and means on said carrier independent of said last mentioned means for operating said plunger intermittently.

17. A packaging machine having parts forming a pathway, an endless flexible carrier movable along said pathway, means for delivering articles to said carrier, said means being operated directly by said carrier, and a wrapper folding member disposed within said pathway and also operated directly from said carrier.

18. A packaging machine having parts forming a straight pathway, an endless carrier having a straight run movable along said pathway to advance the article and wrapper, folding devices along said pathway and supported by said parts and past which the article and wrapper are moved by the carrier, means for supplying the article to the carrier, cams on said carrier for periodically actuating said means, means for supplying the wrapper and devices independent of the carrier for periodically actuating the wrapper supplying means.

19. A packaging machine having parts forming a straight pathway, a flexible endless carrier having a straight run disposed within said pathway and serving to advance the article and wrapper, folding devices within said parts adjacent said pathway and past which the article and wrapper are moved by the carrier, means for supplying the article to the carrier, such means being actuated periodically from the carrier, means for supplying the wrapper, devices independent of the carrier for periodically actuating the wrapper supplying means, a knife for cutting the wrapper into lengths and a cam actuated by the carrier for periodically operating the knife.

In testimony whereof I have signed my name to this specification in the presence of two subscribing witnesses.

GIDEON F. HALL.

Witnesses:
 ISAAC B. OWENS,
 C. J. HORTON.